UNITED STATES PATENT OFFICE.

J. GALUSHA STAUNTON, OF BUFFALO, NEW YORK.

IMPROVEMENT IN PRESERVING FRUIT, MEATS, FISH, &c.

Specification forming part of Letters Patent No. 45,765, dated January 3, 1865; antedated May 18, 1863.

*To all whom it may concern:*

Be it known that I, J. GALUSHA STAUNTON, of the city of Buffalo, in the county of Erie and State of New York, have invented a new and improved process for the preservation of fruit, game, flesh, fish, and other organic substances which are liable to damage or destruction by decomposition; and I do hereby declare that the following is a full, clear, and exact description thereof.

The nature of my invention relates, first, to substituting hydrocarbon gas for the air which occupies the space in and around the fruit or others articles sought to be preserved; second, in submitting the fruit or other articles so surrounded by gas to a temperature as near as possible to and not below 30° Fahrenheit.

I provide myself with any suitable vessel or package of a size and style adapted to the article to be kept or preserved, put in the fruit or other substance, and close up the vessel air-tight, excepting a small hole in the top and one in the bottom. Being supplied with hydrocarbon gas in a receiver or gas-holder, I conduct the gas through a pipe or tube to the orifice in the top of the package, bringing the end of the pipe closely over the aperture. The gas, being lighter than the air, on being forced into the can or vessel, gradually fills it, forcing the air out at the lower aperture. When the air is entirely displaced by the gas both apertures are then closed perfectly tight in the most convenient way, and the operation is complete.

Another method of introducing the gas is by providing a quantity of fluid sufficient to fill the can or vessel containing the fruit or other substance. After filling the vessel with the fluid, apply the gas-pipe at the top of the vessel, and gradually raise it until the fluid has all escaped and its place been supplied with gas from the gas-pipe at the aperture in the top. When the fluid has all escaped the can will be properly filled with the gas without any admixture of air, and may be closed, as before stated.

The use of pure water as the fluid is not advisable; but a proper fluid for fruit is half honey and half water well mixed, and for fish or game a moderately-strong brine.

When properly sealed the can or vessel should be placed and kept in an ice-closet below the ice.

I do not limit myself to any particular method of introducing the gas, as a variety of ways may be advantageously used.

If the above method is fully and perfectly employed, decomposition may be indefinitely postponed.

What I claim as my invention is—

The substitution of hydrocarbon gas in the place of air in the cans or vessels in which fruit or other substances may be inclosed for preservation, for the purposes and substantially as above set forth.

Dated Washington, November 17, 1862.

J. GALUSHA STAUNTON.

Attest:
D. ROWLAND,
J. T. MILLER.